United States Patent
Rick et al.

(10) Patent No.: US 6,707,842 B2
(45) Date of Patent: Mar. 16, 2004

(54) ACCELERATED BASE STATION SEARCHING BY BUFFERING SAMPLES

(75) Inventors: Roland R. Rick, San Diego, CA (US); Brian C. Banister, San Diego, CA (US); Mark Davis, Carlsbad, CA (US)

(73) Assignee: VIA Telecom Co., Ltd., San Diego, CA (US)

(*) Notice: Subject to any disclaimer, the term of this patent is extended or adjusted under 35 U.S.C. 154(b) by 0 days.

(21) Appl. No.: 09/255,032

(22) Filed: Feb. 22, 1999

(65) Prior Publication Data

US 2003/0174760 A1 Sep. 18, 2003

Related U.S. Application Data

(63) Continuation-in-part of application No. 08/956,057, filed on Oct. 22, 1997, now abandoned.

(51) Int. Cl.$^7$ .............................................. H04L 27/30
(52) U.S. Cl. .................... 375/142; 375/150; 375/367; 370/331; 455/33.2
(58) Field of Search ........................ 375/142, 145, 375/149, 150, 365, 367, 368; 370/332, 331, 335, 342, 441; 455/33.2, 67.1

(56) References Cited

U.S. PATENT DOCUMENTS

| | | | | |
|---|---|---|---|---|
| 4,998,111 A | * | 3/1991 | Ma et al. ..................... 342/352 |
| 5,109,390 A | | 4/1992 | Gilhousen et al. ............. 375/1 |
| 5,440,597 A | | 8/1995 | Chung et al. ................. 375/200 |
| 5,530,716 A | | 6/1996 | Lipa ............................. 375/206 |
| 5,557,022 A | | 9/1996 | Murata et al. ................. 370/13 |
| 5,710,768 A | | 1/1998 | Ziv et al. ...................... 370/342 |
| 5,768,306 A | | 6/1998 | Sawahashi et al. ......... 375/206 |
| 5,781,156 A | * | 7/1998 | Krasner .................. 342/357.12 |
| 6,028,883 A | * | 2/2000 | Tiemann et al. ............. 375/150 |
| 6,069,880 A | * | 5/2000 | Owen et al. ................. 375/224 |
| 6,173,008 B1 | * | 1/2001 | Lee .............................. 370/342 |
| 6,208,631 B1 | * | 3/2001 | Kim .............................. 370/332 |
| 6,330,234 B1 | * | 12/2001 | Tomasi et al. ............... 370/342 |
| 6,351,486 B1 | * | 2/2002 | Eidson ......................... 370/335 |
| 6,356,538 B1 | * | 3/2002 | Li ................................ 370/311 |
| 6,483,815 B1 | * | 11/2002 | Laurent et al. .............. 370/318 |

OTHER PUBLICATIONS

DiCarlo et al., "Multiple Dwell Serial Search: Performance and Application to Direct Sequence Code Acquisition," IEEE Trans. Comm., vol. COM–31, No. 5, May 1983, pp. 650–659.

* cited by examiner

Primary Examiner—Stephen Chin
Assistant Examiner—Dac V. Ha
(74) Attorney, Agent, or Firm—Mitchell Siberberg & Knupp LLP (57) ABSTRACT

A method and apparatus for searching for neighboring base stations by waking from a power-saving sleep mode to receive an incoming signal. The incoming signal is received and at least a portion of the incoming signal is stored. The stored information signal is then processed with each of several different codes to determine a power level corresponding to each of the different codes.

17 Claims, 4 Drawing Sheets

ACCELERATED BASE STATION SEARCHING BY BUFFERING SAMPLES

This application is a Continuation-In-Part of U.S. patent application Ser. No. 08/956,057 titled "Method and Apparatus for Accelerated Acquisition of Base Stations by Buffering Samples", filed on Oct. 22, 1997 now abandoned.

BACKGROUND OF THE INVENTION

1. Field of the Invention

The present invention generally concerns wireless mobile communications systems. In particular, the present invention relates to searching for pilot signals of alternate base stations by buffering a received signal.

2. Description of Related Art

In wireless communications technology, user data (e.g., speech) modulates a radio frequency signal for transmission and reception between a base station and a mobile unit. The radio spectrum allocated by regulatory authorities for a wireless system is "trunked" to allow simultaneous use of a spectrum block by multiple units.

The most common form of trunked access is the frequency-division multiple access (FDMA) system. In FDMA, the spectrum is divided into frequency channels comprised of distinct portions of the spectrum. The limited frequency channels are allocated to users as needed. However, once a frequency channel is assigned to a user, that frequency channel is used exclusively by the user until the user no longer needs the channel. This limits the number of concurrent users of each frequency channel to one, and the total number of users of the entire system, at any instant, to the number of available frequency channels. In addition, a single user generally will not at all times use the full capacity of the channel assigned to him. Accordingly, obtaining maximum efficiency of the available resources is difficult to achieve using FDMA solely.

Another common trunking system is the time-division multiple access (TDMA) system. TDMA is commonly used in telephone networks, especially in cellular telephone systems, in combination with an FDMA structure. In TDMA, data (speech) is digitized and compressed to eliminate redundancy, thus decreasing the average number of bits required to be transmitted and received for the same amount of information. The time line of each of the frequency channels used by the TDMA system is divided into "frames" and each of the users sharing the common channel is assigned a time slot within the frames. Each user then transmits or receives a burst of data during its assigned time slot and does not transmit or receive during other times. With the exception of delays required by the bursty data transmission, which typically are small enough to be largely unnoticeable, the TDMA system will appear to the users sharing the frequency channel to have provided an entire channel to each user.

The FDMA and TDMA combination technique is used by the GSM (global system for mobile communications) digital cellular system. In GSM, each channel is divided up in time into frames during which eight different users share the channel. A GSM time slot is only 577 μs (microseconds), and each users gets to use the channel for 577 μs out of every 4.615 ms (millisecond) time interval. 577 μs*8=4.615 ms.

Yet another method for sharing a common channel between multiple users is the code-division multiple access (CDMA) technique which uses direct sequence spread spectrum modulation. CDMA is relatively new to cellular technology and is one of the accepted techniques to be included into the next generation of digital cellular systems in the United States.

As with TDMA, the CDMA systems are typically used in conjunction with a FDMA structure, although this is not required. However, unlike the TDMA system, the CDMA system generally does not separate the multiple users of a common frequency channel using time slices. Rather, in CDMA, multiple users are separated from each other by superimposing a user-specific high-speed code on the data of each user. Because the applied code has the effect of spreading the bandwidth of each user's transmission, the CDMA system is often called a "spread spectrum" system.

Initially, the user information is digitized so that the information is represented as a sequence of "0" and "1" bits. For modulation purposes, it is common to convert this sequence of information bits into a corresponding synchronous time signal having +1 and −1 values, where +1 corresponds to a bit value of "0" and −1 corresponds to a bit value of "1".

"Direct sequence" spreading typically is accomplished by multiplying a narrowband information signal by a much wider band spreading signal. The error and redundancy encoded digital data (speech) for each of the shared users of the CDMA channel may typically be provided at a rate of 19.2 kbps (kilobits per second). These data are then spread using a much higher frequency spreading signal, which may be provided at a rate of 1.2288 Mbps (megabits per second). Using the wider frequency spreading signal, a CDMA frequency channel can accommodate many users on code sub-channels.

The spreading signal is usually a sequence of bits selected from one of 64 different orthogonal waveforms generated using Walsh functions. Specifically, each such Walsh function typically consists of a repeating 64-bit sequence, and thus has a period of 52.083 μs (64 bits/1.2288 Mbps). A different one of the 64 different Walsh functions is utilized for each sub-channel to be included in the frequency channel. At the receiving end, a particular sub-channel can be decoded using the same Walsh function which was used to encode the sub-channel. When decoded in this manner, the desired sub-channel signal is reproduced and the signals from the other 63 sub-channels are output as low level noise. As a result, a user can distinguish its code sub-channel from other users' sub-channels on the same frequency channel.

In addition to the above channel coding, the various sub-channels also are processed using other types of coding. For instance, data on the speech traffic sub-channels typically are encrypted using a repeating pseudo random bit sequence (long code) which is unique to each different mobile unit and which has a period of $2^{42}-1$ bits. In order to coordinate encryption codes with the base unit, upon initial registration with the base unit the mobile unit provides its serial number to the base unit. The base unit then uses that serial number to retrieve the mobile unit's unique encryption code from the base station's database. Thereafter, the two can communicate using encrypted data, so as to provide a certain amount of privacy.

In addition to encryption coding, each sub-channel typically is encoded using an additional repeating pseudo random bit sequence (PN code). The PN code sequence, also referred to as the chipping function, utilized by a particular base station may be expressed as c(t), because it is applied as a function of time t. The PN code sequence is generated using a linear feedback shift register (LFSR) which outputs a pseudo random sequence of digital ones and zeros. These digital ones and zeros are converted to −1 and +1 symbols respectively and then filtered to give the chipping function c(t). Thus the chipping function has the property that $c(t)^2=+1$. The period of the PN code sequence generated by a N-register LFSR is $2^N-1$ bits (or chips) long, though it is common to insert a zero to extend the full sequence length to $2^N$ chips. Typically, the PN code is generated using a 15 bit code word and a 15-register LFSR, providing a repeating sequence of $2^{15}=32,768$ chips. Assuming the system uses the typical chip rate of 1.2288 MHz, the sequence repeats every 26.666 ms.

Generally, the PN code is identical for all base stations in the cellular network. However, each base station typically applies the PN code using a different time delay from the other base stations. For example, each base station generally selects from one of 512 different offsets (spaced 64 chips apart) for use in its PN code. By utilizing different offsets in this manner, a mobile unit can selectively tune to any given base station merely by using the same offset as that base station. Accordingly, it can be seen that merely time shifting a PN code sequence in this manner produces the same result as if each base station were using an entirely different PN code.

In a typical system, each base station uses one of the sub-channels to broadcast a pilot signal. The pilot signal has no underlying information and usually consists of all binary zeroes (symbol =1). This pattern of all "1" symbols is modulated with the appropriate Walsh function so as to occupy sub-channel 0, and then further coded using the base station's PN code, applied with the base station's designated delay. The mobile units use the pilot sub-channel to synchronize themselves with the base station so they can effectively communicate with the base station.

Figure 1:
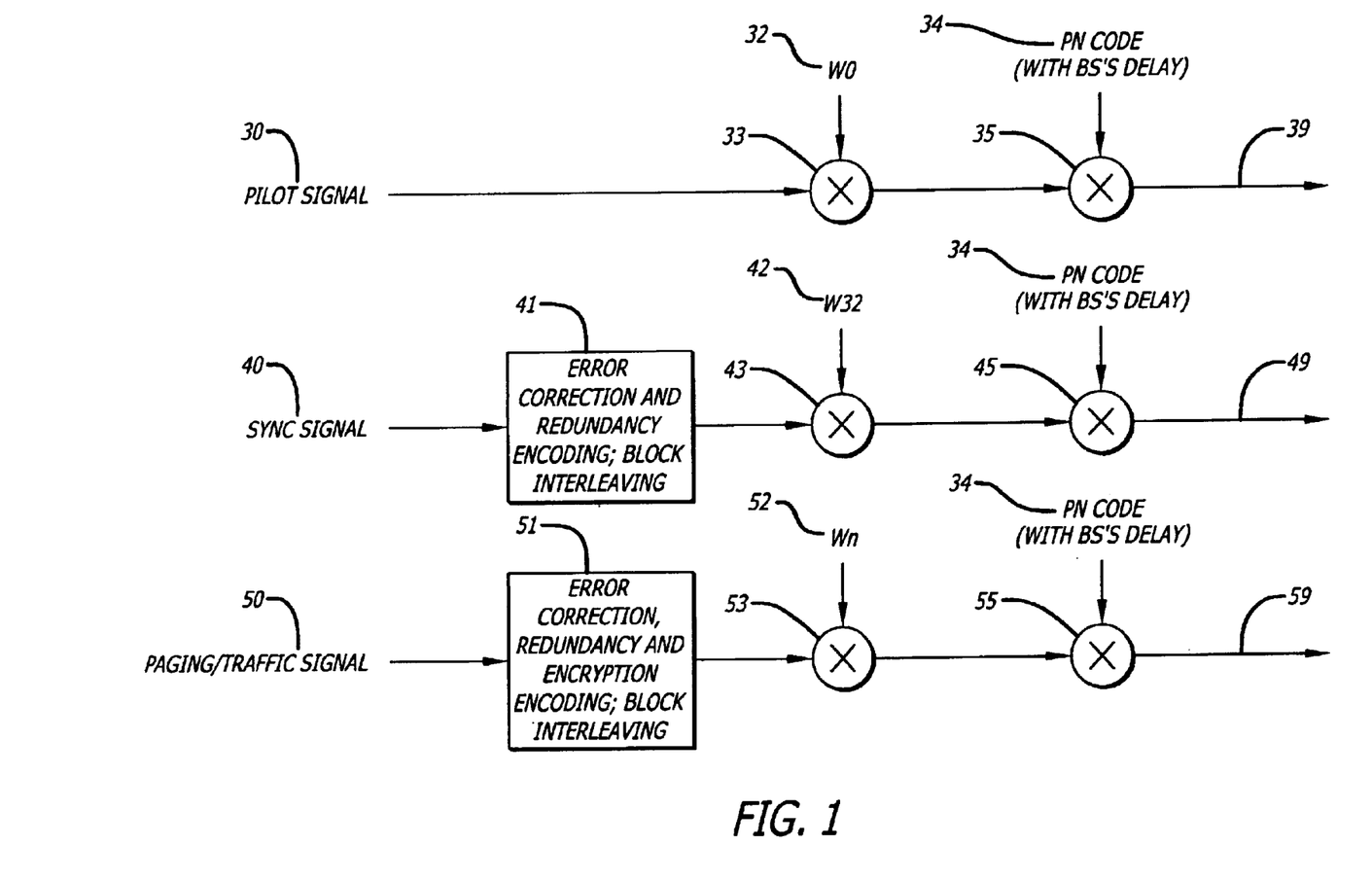
FIG. 1 is a simplified block diagram illustrating certain functions of a base station in a CDMA communications system.

FIG. 1 illustrates a block diagram of a portion of a base unit for explaining the generation and combination of the various sub-channels. As shown in FIG. 1, a pilot signal 30 is one of the signals generated by the base station. As noted above, pilot signal 30 generally will include all "1" symbols. The pilot signal 30 is initially combined with a Walsh function 32 in multiplier 33 so as to provide a signal on sub-channel 0. Because the pilot signal 30 is provided in signal form, it can be combined with Walsh function 32 merely by multiplying the two signals together. However, if pilot signal 30 and Walsh function 32 instead comprised bit sequences, the same result could be obtained by performing modulo-2 addition on each bit in the sequence, rather than multiplication. Next, in multiplier 35, the output signal is combined with PN code sequence 34, which has the base station's designated time delay.

The other sub-channels output by the base station also are subject to Walsh function and PN code spreading. However, as shown in FIG. 1, each other sub-channel typically includes additional signal processing. For instance, sync signal 40, from which the mobile unit obtains synchronization information, typically is also processed using error correction and redundancy encoding, as well as block interleaving (element 41). As indicated in FIG. 1, sync signal 40 is provided on sub-channel 32, which is the sub-channel ordinarily used for a base station's sync signal.

The other 62 sub-channels utilized by the base station include sub-channels for paging and sub-channels used for data (e.g., voice) traffic. The paging sub-channels are used to provide information to the mobile unit, such as instructions regarding which sub-channel to use to initiate a telephone call and information regarding approximate delay times for neighboring base stations. Data traffic signal sub-channels typically are used for voice communications during telephone calls, but can be used for other point-to-point data transmissions, as well. In addition to error correction and redundancy encoding, the paging and traffic signals typically are also subjected to encryption coding prior to performing block interleaving (element 51).

As shown in FIG. 1, the PN code sequence with the base station's designated time delay is applied to each sub-channel generated. The outputs of all the sub-channels, such as outputs 39, 49 and 59, are then added and subsequently subjected to quadrature spreading and quadrature phase shift keying (not shown) in order to modulate the combined signal to the appropriate radio frequency channel.

When a mobile unit is powered on, it initially searches for a pilot signal, in an attempt to establish a lock with a base station. This process is called "acquisition". It is again noted that each base station typically broadcasts in the same 1.2288 MHz (Megahertz) band and utilizes the same sub-channel and the same PN code for its pilot signal. The only difference among the base stations in this regard is the time delay each base station applies to its PN code sequence. Thus, in order to "acquire", or lock on to, a base station, the mobile unit must align its locally generated version of the PN code sequence with the PN code sequence of the base station by determining the timing of the transmitted pilot's spreading sequence.

Therefore, at power up a mobile unit searches for a time delay which produces a sufficiently strong pilot signal to indicate to the mobile unit that it has acquired a base station. The acquisition process generally involves multiplying a received signal with different time-delayed versions of the PN code sequence and then identifying the version which resulted in the greatest signal strength, or identifying the first time-delayed version which results in a signal strength that exceeds a threshold level. The mobile unit then applies the identified time-delay to the PN code sequence used in its transmissions and receptions in all future communications with that base station. An acquisition process is described in pending U.S. patent application Ser. No. 08/956,057, titled "Method and Apparatus for Accelerated Acquisition of Base Stations by Buffering Samples", filed Oct. 22, 1997, which application is incorporated herein by reference as though set forth herein in full.

The acquisition process thus identifies the strongest base station, or at least a sufficiently strong base station, to monitor and with which to communicate. Shortly after acquiring a base station in this manner, the mobile unit will typically enter a slotted paging mode, also called the idle mode. During the slotted paging mode, the mobile unit monitors transmissions from the acquired base station, but only during discrete time slots. In order to save battery power, at all other times the mobile unit enters a power-saving sleep mode. During the sleep mode the mobile unit's RF receiver section typically is shut down and other measures may be employed to minimize power consumption. The mobile unit then wakes from the sleep mode just prior to its designated time slot, monitors the transmission from the base station to determine if any action needs to be taken (e.g., receive a telephone call), and then returns to the sleep mode if no such other action is required.

In addition to monitoring for messages, the mobile unit also uses the received signal to search for alternate base stations. In this regard, it is possible that the mobile unit initially locked on to a base station that may not correspond to the strongest signal received by the mobile unit. Moreover, because the mobile unit may be moving, a different base station might now be providing the strongest signal. In the event that the mobile unit finds a stronger base station signal, the mobile unit will request a handoff and then begin communicating with the new base station. In this way, the mobile unit can be moved arbitrarily within the cellular network, generally with no interruption in service.

The searching process is very similar to the initial acquisition, in that the received signal is processed with different time-delayed versions of the PN code sequence to identify the strongest signal. However, because the mobile unit is already in communication with a base station, the amount of processing can be significantly reduced by narrowing the required search. In particular, the current base station stores the approximate time delay associated with all surrounding base stations. By transmitting a message to the mobile unit indicating this information, the mobile unit can constrain its search to a relatively small window around each alternate base station's expected time delay.

In conventional mobile units, this searching process is carried out by performing additional processing on the incoming signal as it is received. Specifically, in addition to processing the received signal with the current base station's time-delayed version of the PN code sequence and then examining the resulting information signal to determine if any additional action needs to be taken, the same signal is separately processed with other time-delayed versions of the PN code sequence to determine power levels corresponding with those delays. The time delay within the search window that results in the largest signal strength generally will correspond to the time delay of the alternate base station for that window. The signal strength of the alternate base station can then be compared with that of the current base station to determine whether a handoff should be made.

Figure 2:
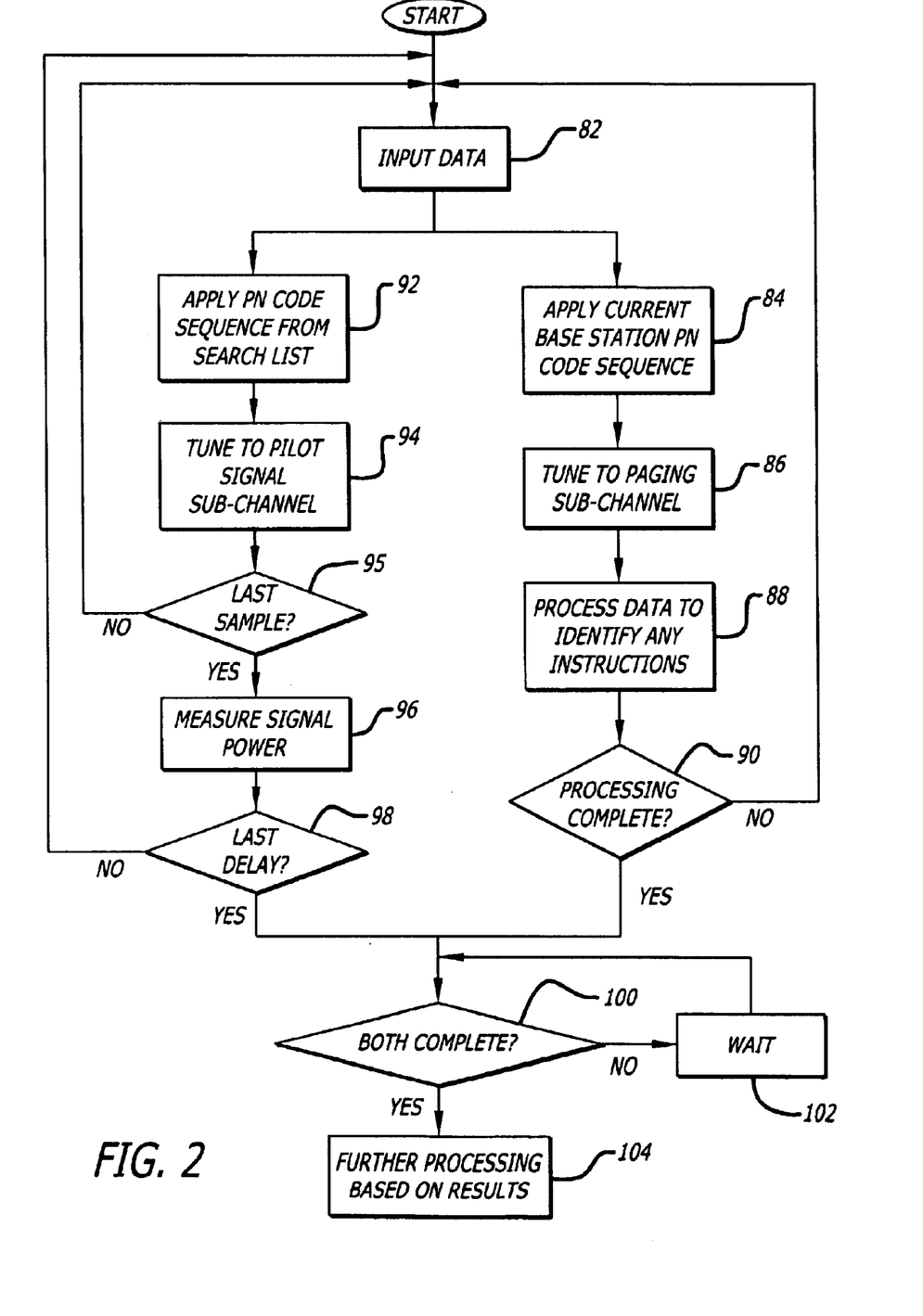
FIG. 2 is a flowchart illustrating an example of conventional mobile unit processing during a slotted paging mode.

A flow diagram for explaining this processing is illustrated in FIG. 2. Initially, in step 82 data are input. Thereafter, processing proceeds down two paths simultaneously.

In one path, the current base station's PN code sequence is applied to the input data. In step 84, this step enables the mobile unit to monitor transmissions from only the current base station. Upon removing the PN code from the data, in step 86, the Walsh function corresponding to the appropriate paging sub-channel is applied, thereby tuning to the desired paging sub-channel. In step 88, the data are decoded in order to decrypt, remove redundancy and reverse the effects of block interleaving. Thereafter, the data are processed to identify any instructions from the base station. In step 90, it is determined whether processing is complete, i.e., whether the mobile unit has fully decoded the instructions from the base unit. If not, processing returns to step 82 to input more data. In the event that step 90 determines that processing is complete, then processing proceeds to step 100, which is described below.

At the same time that instructions from the currently monitored base station are being processed, the mobile unit searches for alternate base stations to monitor. In particular, in step 92 a PN code sequence having a delay in the applicable search list is applied to the input data. As noted above, the PN code sequence delays are selected based on windows around the expected time delays for neighboring base stations. In step 94, the Walsh function for sub-channel 0 is applied to the process data so as to tune to the pilot signal sub-channel.

Next, in step 95, it is determined whether all required samples have been collected. If so processing proceeds to step 96. Otherwise, processing returns to step 82 to receive the next sample. It is noted that steps 92 and 94 generally will take much less time than the time interval between samples. Accordingly, upon completion of step 94, a significant amount of time generally will have to be spent waiting for the next sample.

In step 96, the signal power for all the samples for the current time delay is measured. Typically, this step is performed by summing the input signal over the required number of samples and then squaring the summation.

Finally, in step 98 it is determined whether the last delay required to be searched has been processed. If not, processing returns to step 82 to input additional data, and thereby enable search processing for the next delay time. On the other hand, if all required delays have been searched in step 98, then processing proceeds to step 100.

In step 100, it is determined whether both paths have completed their processing. In this regard, it is noted that further processing often will not be capable of being completed until both paths have completed processing. For example, if a "release" instruction has been identified in steps 84 to 90, meaning that the mobile unit should return to sleep mode, the mobile unit might nevertheless be delayed in returning to sleep mode (step 102) until the processing required in steps 92 to 98 has been completed. As a result, the mobile unit uses more power than is absolutely required.

In step 104, additional processing is performed based on the results of the two processing paths. Such processing might include, for example, preparing for hand-off to a different base station or initiating communications to start a telephone call. However, most commonly the mobile unit will merely return to the power-saving sleep mode by shutting down its RF section and possibly performing other power-saving steps.

While the foregoing conventional technique works well in certain cases, the present inventors have discovered that in many situations the amount of time required to perform the search process is greater than the amount of time required to analyze the message being received from the current base station, and in these cases the mobile unit is delayed in returning to the sleep mode. In fact, this situation has become more common, in part as a result of recent successes by the present inventors in reducing the amount of time required to analyze messages from the current base station. Accordingly, the limiting factor preventing the mobile unit from returning to the sleep mode is more frequently becoming the time required to perform alternate base station searching. What is needed, therefore, is a faster method for performing such searching.

SUMMARY OF THE INVENTION

The present invention addresses the foregoing need by performing alternate base station searching by buffering incoming samples.

Thus, in one aspect, the invention searches for neighboring base stations by waking from a power-saving sleep mode to receive an incoming signal. The incoming signal is received and at least a portion of the incoming signal is stored. The stored information signal is then processed with each of plural different codes, such as different time delayed versions of the same pre-stored code, to determine a power level corresponding to each code.

In a further aspect, the invention provides an apparatus for communicating in a cellular communications system which is capable of operating in a slotted paging mode, during which the apparatus monitors communications for a current base station only during designated time slots. The apparatus includes means for placing the apparatus into a power-saving sleep mode. Awakening means awakens the apparatus from the power-saving sleep mode just prior to a designated time slot, and receiving means receives a signal from a current base station, with the receiving means being activated by the awakening means. Monitoring means then monitors a paging sub-channel of a current base station signal embedded in the signal received by the receiving means, in order to identify instructions from the current base station. Storing means stores at least a portion of the signal received by the receiving means, and searching means searches for alternate base stations by combining the stored signal with each of plural time delayed versions of a pre-stored code to determine a power level corresponding to each of the time delayed versions of the pre-stored code.

By virtue of the foregoing arrangements, the present invention generally can perform alternate base station search processing much faster than conventional techniques would permit. In particular, by buffering input samples in the foregoing manner, the present invention can largely avoid the need to wait for each next sample to be input when performing search processing. As a result, the mobile unit often will be able to return to a power-saving sleep mode faster than with conventional techniques. Moreover, it is noted that, according to the present invention, once a sufficient set of samples has been buffered, the RF section of the mobile unit is no longer required for alternate base station searching. Accordingly, the present invention makes it possible to continue to perform search processing even after the RF section has been shut down, which is generally not possible with conventional techniques. Thus, the present invention often can even further reduce power consumption.

The foregoing summary is intended merely to provide a quick understanding of the general nature of the present invention. A more complete understanding of the invention can only be obtained by reference to the following detailed description of the preferred embodiment in connection with the accompanying drawings.

DETAILED DESCRIPTION OF THE PREFERRED EMBODIMENT(S)

Figure 3:
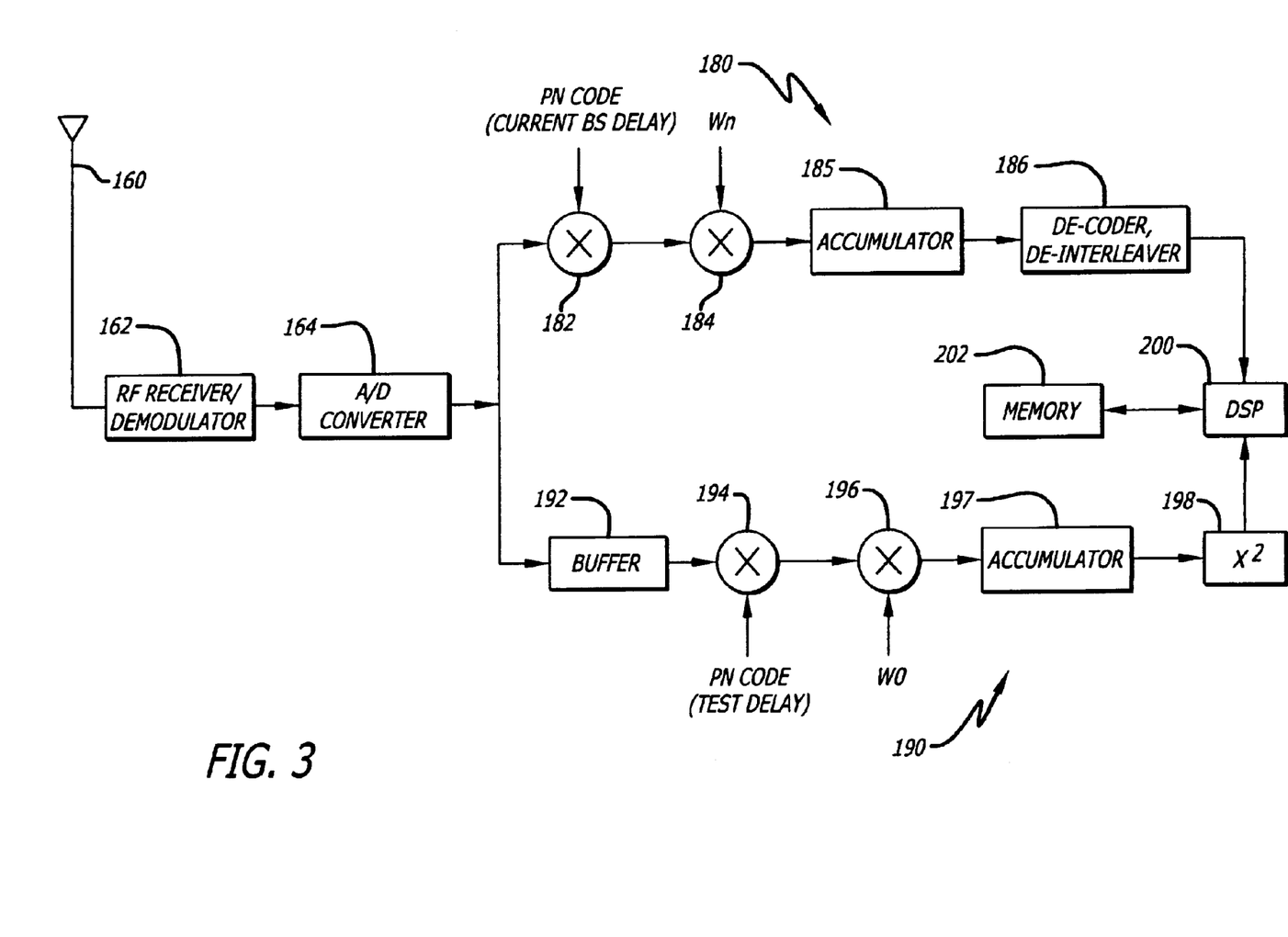
FIG. 3 is a simplified block diagram illustrating certain functions of a mobile communications unit according to a representative embodiment of the present invention.

FIG. 3 is a block diagram of a portion of a mobile unit according to a representative embodiment of the invention. Included in the mobile unit is an antenna 160 for receiving radio frequency signals in the 800 and 900 MHz ranges. As shown in FIG. 3, connected to antenna 160 is a RF receiver/demodulator 162 for removing the radio frequency carrier from incoming signals. RF receiver/demodulator 162 is part of the RF section of the mobile unit, which typically also includes a transmitter. Connected to the output of receiver/modulator 162 is A/D converter 164 for sampling the demodulated analog signal and then quantifying each sampled signal level. The digital samples output from A/D converter 164 are then supplied both to a processing path 180 for decoding and identifying instructions from a currently monitored base station and to a path 190 for performing processing to search for alternate base stations.

The first element in path 180 is multiplier 182, in which the digital samples output from A/D converter 164 are multiplied by the PN code sequence. Specifically, the PN code sequence is applied using the currently monitored base station's delay time, as determined during the initial acquisition process or during a subsequent search. The signal is then multiplied in multiplier 184 with the Walsh function corresponding to sub-channel n, where n is the sub-channel number of the paging sub-channel of the current base station being monitored. Accumulator 185 then converts the data rate from 1.2288 megasamples per second (Msps) to a lower rate such as 19,200 samples per second. Thereafter, the signal is de-coded and de-interleaved in block 186, which preferably represents a chain of hardware elements, such as a multiplier for removing encryption, followed by a block de-interleaver, followed by a convolutional decoder for removing redundancy. The decoded data are then input into digital signal processor (DSP) 200.

Included in processing path 190 is buffer 192 for storing the digitized samples output from A/D converter 164. After buffering in buffer 192, the samples can be read and reread from buffer 192 as many times as desired, generally much more quickly than new data can be input via the paging sub-channel. As data are read from buffer 192, they are multiplied in multiplier 194 by the PN code sequence, which has been delayed using a predetermined test delay. Next, in multiplier 196 the data are multiplied by the Walsh function corresponding to sub-channel 0, thereby attempting to decode the pilot sub-channel. In accumulator 197, the values for a particular sequence length are added. Then, in element 198 the values output from accumulator 197 are squared. Upon completion of the foregoing sequence, the square of the summed values are output by element 198 to obtain a power estimate for the current time delay. That power estimate is then input into digital signal processor 200.

Digital signal processor 200 performs various functions, such as identifying instructions from the currently monitored base station, determining whether a handoff to another base station should be requested based on power levels of alternate base stations, and placing the mobile unit into, as well as performing processing required for, various operational modes of the mobile unit. In connection with this processing, DSP 200 has access to memory 202 for temporary data storage. Typically, memory 202 is implemented as RAM.

In a mobile unit according to the preferred embodiment of the invention, various modes of operation are utilized. For instance, upon initial power-up, the mobile unit typically will enter an acquisition mode in which the mobile unit attempts to acquire a base station with which to communicate. Typically, immediately after the acquisition mode, the mobile unit will enter a slotted paging mode, also known as the idle mode. In the slotted paging mode, the mobile unit monitors transmissions from the acquired base station, but only during designated time periods, or time slots. In this regard, it is typical to divide the paging sub-channels into a number of 80 ms time slots.

During time slots when the mobile unit is not monitoring base station transmissions, the mobile unit usually can enter a power-saving sleep mode in order to conserve battery power. Typically, during the power-saving sleep mode, the RF receiving section of the mobile unit is de-activated. In addition, other power-saving techniques also may be employed. However, at least some processing still occurs during the power-saving sleep mode, such as time keeping in order to alert the mobile unit when to awaken from the power-saving sleep mode. Thus, either a general-purpose digital signal processor or special purpose hardware element can remain active so as to provide the required wakening signals. Just prior to the next designated time slot, the mobile unit wakens from the power-saving sleep mode and prepares to receive a transmission from the currently monitored base station, such as by powering up the RF section of the mobile unit.

Figure 4:
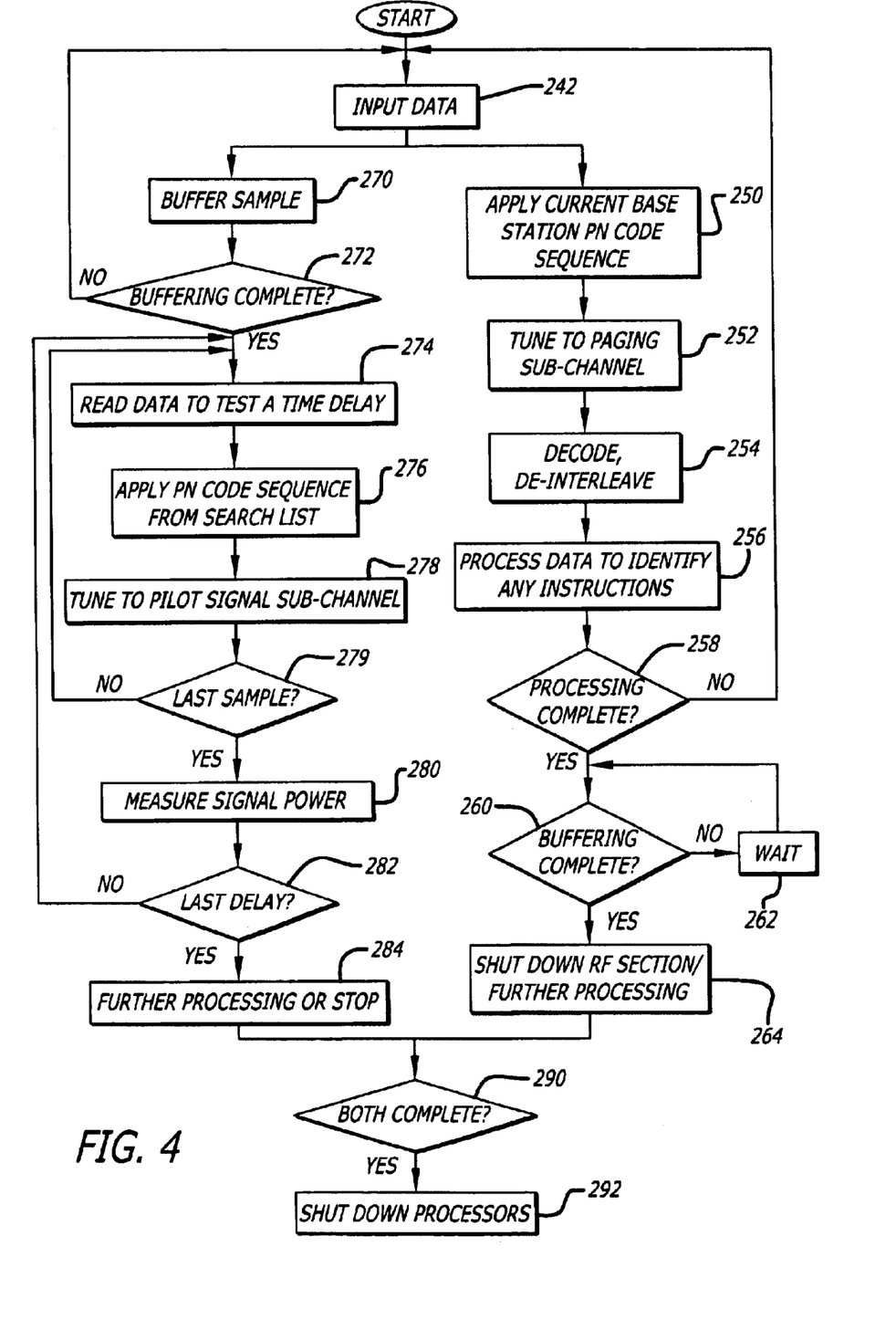
FIG. 4 is a flowchart illustrating mobile unit processing during the slotted paging mode according to the preferred embodiment of the present invention.

FIG. 4 illustrates a flow diagram for explaining slotted paging mode processing according to the preferred embodiment of the invention. Initially, a data word is input in step 242. Specifically, the data input in step 242 have been demodulated by demodulator 162 and converted into digital information in A/D converter 164. Moreover, the data typically will be input at a rate of 1.2288 Msps.

The two processing paths after data input step 242 correspond to the two hardware processing paths shown in FIG. 3. Specifically, the processing path beginning with step 250 corresponds to hardware path 180 in FIG. 3 and the processing path beginning with step 270 in FIG. 4 corresponds to hardware processing path 190 shown in FIG. 3. The processing path beginning with step 250 (the instruction processing path) will be described first.

In step 250, the current base station PN code sequence is applied to the input data. As indicated above, this step is preferably performed by multiplying the digital samples of the input signal by the samples in the PN code sequence, such as in multiplier 182. Also, as noted above, the PN codes are identical for all base stations, with different delays being applied for each base station. Thus, the delay for the currently monitored base station, which was determined during acquisition or during a prior search mode, is utilized in this step. As a result of this step, only the signal for the currently monitored base station is reproduced, with signals from all other base stations being output as low-level noise.

In step 252, the mobile unit "tunes" to the paging sub-channel of the current base station by applying the Walsh function corresponding to that paging sub-channel. Preferably, this step is performed by multiplying the signal by the appropriate Walsh function in multiplier 184. As a result of this step, only the paging sub-channel signal is reproduced, and all other sub-channel signals are output as low-level noise.

Next, in step 254 the data are processed to reverse the interleaving and encoding performed at the base station in element 51 (shown in FIG. 1). Preferably, at least a portion of this processing is performed in hardware, such as in element 186. For example, de-encryption generally can be performed by merely multiplying the signal by the same long code applied at the base station (which, as noted above, generally will be unique to the mobile unit). However, it is noted that the processing in this step can be performed by any mixture of hardware and software.

In step 256, the de-coded data are processed to identify any instructions provided by the base station. Preferably, this step is performed in DSP 200. Most of the time, the message will only include a "release" instruction, which permits the mobile unit to return to the power-saving sleep mode without performing additional processing. It is also noted that in most passes (i.e., a single pass is performed for each data word input) there will be insufficient input data to identify an instruction. Accordingly, in most passes processing will merely immediately proceed to step 258.

In step 258, it is determined whether processing is complete. If not, then processing proceeds to step 242 to receive the next data word. As noted above, the data are input at a rate of 1.2288 Msps. However, the processing in steps 250 to 258 generally will occur at a much faster rate. Accordingly, there generally will be some waiting time between the completion of step 258 and the input of the next data sample. If it is determined in step 258 that processing is complete, then processing proceeds to step 260, which step is dependent upon the other processing path and will be discussed below. However, we will first discuss the processing in the other processing branch, beginning with step 270.

In step 270, the input sample is buffered, such as by writing the data word into buffer 192.

In step 272, it is determined whether buffering is complete. In this regard, it is preferable to buffer the maximum number of samples which may be needed to evaluate a test delay in searching for an alternate base station. In the current embodiment of the invention, this typically will be on the order of several hundred to several thousand samples. If buffering is not complete, then processing returns to step 242 to await input of the next data sample. Otherwise, processing proceeds to step 274.

In step 274, one data word is read from buffer 192 to permit alternate base station power estimation with adequate accuracy. The following steps are then performed in pipeline fashion as such data are read out from the buffer 192.

In step 276, a PN code sequence is applied to the data, such as by using multiplier 194. Preferably, the PN code sequence has a delay taken from a search window centered around the expected delay of a neighboring base station. The center of the window preferably will be based on a message supplied from the currently monitored base station. In addition, the width of the window also may be provided by the currently monitored base station. Alternatively, the search window width may be calculated internally by the mobile unit or pre-stored by the mobile unit, based on maximum expected variations in the delay times. During a given time slot, the mobile unit may be searching for a single alternate base station or two or more different alternate base stations, depending upon certain parameters of the slotted paging mode. A different search window preferably will be obtained for each alternate base station to be searched.

In step 278, the pilot signal sub-channel is selectively received, preferably by multiplying the data signal by the Walsh function corresponding to sub-channel 0, such as in multiplier 196. As a result of this step, all other sub-channels generally will be output as low-level noise.

In step 279, it is determined whether the last sample for the current time delay has been processed. As noted above, the number of samples typically will be in the range of several hundred to several thousand. If the last sample has been processed, processing proceeds to step 280. Otherwise, processing returns to step 274 to read the next sample. However, in this case, unlike conventional techniques, it is not necessary to wait for the next sample to be input. Rather, the next data word is merely read from buffer 192, which is substantially faster.

In step 280, the signal power level for the current test delay is measured, preferably by summing the sample values output from step 278 in accumulator 197 and then squaring the summation using squaring element 198, as shown in FIG. 3. In this manner, a power level is determined for the current test delay.

In step 282, it is determined whether the last time delay has been processed. If not, then processing returns to step 274 to read samples from the buffer for processing with the next time delay. In this case, it is preferable that the same samples are re-processed using the new time-delayed versions of the PN code. On the other hand, if the last delay has been processed, then processing proceeds to step 284.

In step 284, it is determined whether further processing is required, such as by using DSP 200. Specifically, if one of the searched alternate base stations is providing a signal power level which is higher than that of the currently monitored base station, then further processing typically will be performed to verify that the alternate base station consistently provides a higher power signal. If so, then processing typically will be begun to initiate a handoff to the alternate base station. After such a handoff, the mobile unit will switch to monitoring the identified alternate base station.

It is noted, however, that most of the time the current base station will provide the higher power signal, and so no further processing will be required in step 284. In general, the only time a handoff will be required is if the mobile unit has been physically moved a sufficient distance away from the current base station and toward an alternate base station.

Returning to the other processing path, it is noted that step 260 is identical to step 272 and determines whether buffering has been completed in the search processing path. If not, processing proceeds to step 262 to wait until such buffering has been completed. However, it is noted that buffering ordinarily will have been completed well in advance of the instruction processing, because typically only a small fraction of the samples required for instruction processing need to be buffered. Thus, processing will normally proceed immediately to step 264.

In step 264, processing is performed to carry out the decoded instruction. In this regard, most of the time the instruction processing will have merely identified a "release" instruction, indicating that the mobile unit should merely return to the power-saving sleep mode. Accordingly, this processing ordinarily will involve shutting down the mobile unit's RF section and performing various other power-saving measures.

In step 290, it is determined whether both paths have been completed. When that condition is satisfied, the processors are shut down in step 292.

Based on the above description, it can be readily seen that, in accordance with the present invention, search processing can be performed much faster than when using conventional techniques. In particular, because the samples are buffered, the search processing generally will not need to stop and wait for each additional input data word. As a result, the search processing often will be completed before the instruction processing. Moreover, even if search processing takes longer than instruction processing, the RF section of the mobile unit typically still can be shut down sooner than in conventional techniques because, after the initial buffering, the search processing does not need to receive any additional input data. As noted above, such buffering ordinarily will require significantly less time than instruction processing. Therefore, the mobile unit's RF section usually can be shut down immediately after instruction processing has been completed, particularly if the received instruction is merely a "release" instruction.

The amount of time saved by performing search processing according to the present invention is comparable to the time saved in the inventive acquisition processing described in U.S. patent application Ser. No. 08/956,057. Accordingly, the processing time comparison calculations described therein are also applicable to the present technique, and are incorporated herein by reference.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Rather, it is intended that all such variations not departing from the spirit of the invention be considered as within the scope thereof as limited solely by the claims appended hereto.

For instance, in the foregoing description a particular hardware configuration is specified. However, it should be noted that other hardware configurations may instead be utilized in the practice of the present invention. In addition, it should also be noted that the processing according to the present invention may be performed by any combination of hardware and software, with the specific combination chosen based on then current technological, economic and timing consideration tradeoffs.

In addition, in the above embodiment, search processing is shown in which samples are always buffered. Although this generally will be the case during slotted paging mode, it should be noted that buffering can be selectively applied, i.e., performing buffering in certain situations and search processing the input data without buffering in other situations where it would not be efficient to buffer. Furthermore, by performing certain modifications to the above-described processing, which would be obvious to those skilled in the art, the first time delay can be search-processed while the set of input data is being buffered, thereby resulting in further efficiencies.

Also, in the foregoing description a serial search is performed using buffered samples. However, it should be noted that the present invention also contemplates performing a parallel search using the buffered samples, such as by using Fast Fourier Transform (FFT) or Discrete Cosine Transform (DCT) processing. Furthermore, different base stations are distinguished from each other in the above-described embodiment by using different time delays of the same PN code. However, the foregoing techniques may also be applied where base stations are distinguished by different PN codes or any other different codes.

In the following claims, those elements which do not include the words "means for" are intended not to be interpreted under 35 U.S.C. §112 ¶6.

What is claimed is:

1. A method of searching for neighboring base stations, comprising:
   (a) receiving an incoming signal via a radio frequency (RF) receiver;
   (b) storing at least a portion of the incoming signal, thereby obtaining a stored information signal;
   (c) turning off the RF receiver;
   (d) processing the stored information signal with each of plural different codes to determine a power level corresponding to each of said plural different codes and performing a parallel search of the stored information signal using at least one of Fast Fourier Transform (FFT) and Discrete Cosine Transform (DCT) processing; and
   (e) selecting a base station with which to communicate based on the processing performed in step (d), wherein at least a portion of the processing in step (d) is performed while the RF receiver is turned off.

2. A method according to claim 1, further comprising a step of monitoring communications from a current base station.

3. A method according to claim 2, wherein each of the plural different codes corresponds to a different neighboring base station.

4. A method according to claim 2, wherein the plural different codes comprise different time delays of a single pre-stored code.

5. A method according to claim 4, wherein the different time delays for the plural time delayed versions of the pre-stored code are taken from a search window corresponding to possible delays for an alternate base station, and wherein information concerning the search window is received from the current base station.

6. A method according to claim 4, wherein the pre-stored code is a pseudo random code.

7. A method according to claim 2, wherein the power levels obtained in step (d) are used to determine whether a handoff should be made to an alternate base station.

8. A method according to claim 2, further comprising a step of comparing a highest power level obtained in step (d) to a power level identified for the current base station for purposes of determining whether to cease monitoring transmissions from the current base station and begin monitoring transmissions from an alternate base station corresponding to the highest power level obtained.

9. A method according to claim 1, wherein step (d) is performed by multiplying the stored information signal with each of the plural time delayed versions of the pre-stored code.

10. An apparatus for communicating in a cellular communications system, comprising:
   (a) receiving means for receiving an incoming signal via a radio frequency (RF) receiver;
   (b) storing means for storing at least a portion of the incoming signal, thereby obtaining a stored information signal;
   (c) control means for turning off the RF receiver;
   (d) processing means for processing the stored information signal with each of plural different codes to determine a power level corresponding to each of said plural different codes and for performing a parallel search of the stored information signal using at least one of Fast Fourier Transform (FFT) and Discrete Cosine Transform (DCT) processing; and
   (e) selecting means for selecting a base station with which to communicate based on the processing performed by said processing means,
   wherein at least a portion of the processing by said processing means is performed while the RF receiver is turned off.

11. An apparatus according to claim 10, further comprising means for waking said apparatus from a power-saving sleep mode just prior to receiving the incoming signal by said receiving means.

12. An apparatus according to claim 10, further comprising means for monitoring communications from a current base station.

13. An apparatus according to claim 12, wherein each of the plural different codes corresponds to a different neighboring base station.

14. An apparatus for communicating in a cellular communications system which is capable of operating in a slotted paging mode during which said apparatus monitors communications from a current base station only during designated time slots, said apparatus comprising:
   means for placing said apparatus into a power-saving sleep mode;
   awakening means for awakening said apparatus from the power-saving sleep mode just prior to a designated time slot;
   receiving means for receiving a signal from a current base station, wherein said receiving means is activated by said awakening means;
   monitoring means for monitoring a paging sub-channel of a current base station signal embedded in the signal received by said receiving means, in order to identify instructions from the current base station;
   storing means for storing at least a portion of the signal received by said receiving means, to obtain a stored signal;
   control means for turning off the receiving means;
   frequency analysis means for performing a parallel search of the stored signal using at least one of Fast Fourier Transform (FFT) and Discrete Cosine Transform (DCT) processing; and
   searching means for searching for alternate base stations by combining the stored signal with each of plural time delayed versions of a pre-stored code to determine a power level corresponding to each of said time delayed versions of the pre-stored code,
   wherein at least a portion of the searching by said searching means is performed while the RF receiver is turned off.

15. An apparatus according to claim 14, wherein searching for alternate base stations by said searching means is performed simultaneously with monitoring by said monitoring means.

16. An apparatus according to claim 14, wherein said control means turns off said receiving means upon completion of monitoring by said monitoring means and storing by said storing means, regardless of whether or not said searching means has completed searching for alternate base stations.

17. An apparatus according to claim 14, wherein said at least a portion of the searching by said searching means is independent of receipt of the signal by said receiving means.

* * * * *